(12) United States Patent
Chen

(10) Patent No.: US 11,145,930 B2
(45) Date of Patent: Oct. 12, 2021

(54) INFLATION PUMP BOX WITH DETACHABLE POWER SUPPLY

(71) Applicant: JINGYAN MECHANICAL&ELECTRICAL TOOLS CO., LTD, Jinhua (CN)

(72) Inventor: Yanqing Chen, Jinhua (CN)

(73) Assignee: JINGYAN MECHANICAL & ELECTRICAL TOOLS CO., LTD, Jinhua (CN)

( * ) Notice: Subject to any disclaimer, the term of this patent is extended or adjusted under 35 U.S.C. 154(b) by 147 days.

(21) Appl. No.: 16/597,824

(22) Filed: Oct. 9, 2019

(65) Prior Publication Data

US 2020/0112002 A1    Apr. 9, 2020

(30) Foreign Application Priority Data

Oct. 9, 2018    (CN) .......................... 201821631921.8

(51) Int. Cl.
| | |
|---|---|
| *H01M 50/244* | (2021.01) |
| *H01M 50/247* | (2021.01) |
| *F04D 29/40* | (2006.01) |
| *F04D 25/06* | (2006.01) |
| *H01M 50/267* | (2021.01) |

(52) U.S. Cl.
CPC ...... *H01M 50/244* (2021.01); *F04D 25/0673* (2013.01); *F04D 29/403* (2013.01); *H01M 50/247* (2021.01); *H01M 50/267* (2021.01); *H01M 2220/30* (2013.01)

(58) Field of Classification Search
CPC .......................... F04D 13/068; F04D 25/0673; H01M 50/244; H01M 50/247; H01M 50/267

USPC ............................................. 417/411; 141/38
See application file for complete search history.

(56) References Cited

U.S. PATENT DOCUMENTS

| | | | | |
|---|---|---|---|---|
| 9,095,992 B2* | 8/2015 | Reuterberg | ........... | F04D 13/068 |
| 2008/0186686 A1* | 8/2008 | Buck | ..................... | H01M 50/20 |
| | | | | 361/747 |
| 2008/0286124 A1* | 11/2008 | Sen | ......................... | F04D 25/084 |
| | | | | 417/234 |
| 2012/0269663 A1* | 10/2012 | Kamiya | .............. | F04D 25/0673 |
| | | | | 417/411 |

FOREIGN PATENT DOCUMENTS

| | | | | |
|---|---|---|---|---|
| JP | 2012112282 A | * | 6/2012 | |
| WO | WO-2014119181 A1 | * | 8/2014 | ............. F04D 25/08 |

\* cited by examiner

*Primary Examiner* — Gregg Cantelmo

(57) ABSTRACT

An inflation pump box with a detachable power supply comprising a box housing and a battery pack connected to a surface of the box housing, wherein the surface of the box housing is provided with a cavity which is internally provided with a connection block connected to the box housing, a snap-in plate is detachably connected above the connection block, the center of the snap-in plate is provided with a battery chamber for installing the battery pack, slideways for enabling the battery pack to slide are provided on two sides of the battery chamber, a lock bar for fixing the battery pack is provided in front of the battery chamber, a lock block is provided in the center of the battery chamber, and the lock block is internally connected to a contact sheet which is detachably fitted and connected to the battery pack. The box is convenient for the user.

6 Claims, 3 Drawing Sheets

INFLATION PUMP BOX WITH DETACHABLE POWER SUPPLY

TECHNICAL FIELD

The present invention relates to an inflation pump box with a detachable power supply.

BACKGROUND ART

Inflation pump boxes are a type of box-type inflation pump, which is a tool performing inflation mainly by means of a motor installed inside the box, and the specific working principle thereof is that air is sucked while the motor is running, such that a valve of a connector is opened by the air pressure of the atmosphere, and the air enters an air cylinder; and when an article is being pumped or inflated, the valve is closed by the air pressure in the air cylinder, so that the air enters the article that needs to be inflated. The conventional inflation pump boxes often use external power wires for power-on work, that is, electric wires of the boxes per se are plugged into household plugs for work. For the conventional power supply mode with the external power wires, when the external power supply is in outage or the length of the electric wires of the boxes per se is not enough to connect same to the household plugs, there will be the case where the inflation pump boxes cannot be used for work, which not only reduces the range of use of the inflation pump boxes, but also prevents a user from operating and using the inflation pump boxes outdoors without a household power plug, so that the user's convenience in using the inflation pump box is affected, and the portable and convenient characteristics of the inflation pump boxes per se are also reduced.

SUMMARY OF THE UTILITY MODEL

The present utility model mainly solves the technical problems existing in the prior art, and provides an inflation pump box with a detachable power supply, which is convenient for of disassembling, replacing and adjusting a battery pack, and is convenient for a user to operate and use, thereby effectively improving the use portability and convenience of the user.

The present utility model relates to an inflation pump box with a detachable power supply, the inflation pump box comprising a box housing and a battery pack fitted and connected to a surface of the box housing, wherein the surface of the box housing is provided with a cavity which is internally connected to a connection block, a snap-in plate is detachably connected above the connection block, the center of the snap-in plate is provided with a battery chamber for installing the battery pack, a lock bar for fixing the battery pack is provided in front of the battery chamber, and a contact sheet is provided at the center of the battery chamber.

Preferably, the battery pack is slidably provided at the center of the battery chamber, a side of the battery chamber is provided with a slideway, and a side of the battery pack is provided with a guide rail which is in a sliding fit with the slideway. The sliding fit between the guide rail and the slideway enables the battery pack to slide inside the battery chamber, so that the battery pack can be installed into or removed from the battery chamber.

Preferably, a lock block for fixing the contact sheet is connected to the center of the battery chamber, and the contact sheet is detachably fitted to the battery pack. When the battery pack is installed inside the battery chamber, the contact sheet inside the battery chamber can make contact with the battery pack and is then energized, and the contact sheet penetrates the snap-in plate, such that the contact sheet can be electrically connected to an electric motor inside the box housing, so that the battery pack is electrically connected to the electric motor via the contact sheet to supply power to the electric motor.

Preferably, a groove is provided in the center of the lock bar, a latch is provided in front of the battery pack, and the groove is detachably fitted and connected to the latch. When the battery pack is installed into the battery chamber, the battery pack can be connected and fixed by fitting the latch to the groove, so as to prevent the battery pack from falling off after the installation is completed. The latch of the battery pack is a push button-type lock.

Preferably, the connection block is connected to an inner surface of the box housing, a snap groove is connected above the connection block, and a surface of the snap-in plate is connected to a snap head which is detachably fitted and connected to the snap groove, such that the connection block is fixed to the inner surface of the box housing, and the snap-in plate can be snap-fitted over the connection block by fitting the snap head to the snap groove, thereby facilitating the manufacturer to quickly assemble the snap-in plate.

Preferably, one or more said cavities are provided, each of which is respectively internally provided with a connection block, and the center of each connection block is fitted and connected to a snap-in plate for mounting the battery pack, such that the manufacturer can properly design the number of the cavities according to the required installation condition of the battery pack, and the use of the inflation pump box with various voltage power supplies can be facilitated, thereby effectively improving the user's convenience of use.

Preferably, the area of the cavity is larger than that of the connection block, and the area of the connection block is larger than that of the snap-in plate, so that battery packs of various different types can be connected inside the cavity through the snap-in plate, the size range of the battery packs that can be installed is increased, and the assembly convenience of the manufacturer is effectively improved.

The present patent has the following beneficial effects: the inflation pump box with a detachable power supply has the characteristics of disassembling, replacing and adjusting the battery pack, and is convenient for the user to operate and use, thereby effectively improving the use portability and convenience of the user; since the surface of the box housing is provided with a cavity which is internally connected to a connection block for installing the snap-in plate, a battery chamber for installing the battery pack is provided in the center of the snap-in plate, and a lock bar for fixing the battery pack is provided in front of the battery chamber, such that the battery pack can be fixed inside the battery chamber of the center of the snap-in plate via the lock bar, the battery pack is installed inside the cavity through the connection between the snap-in plate and the connection block, and the battery pack is detachably assembled to the surface of the box housing, and is electrically connected to the battery pack via the contact sheet in the center of battery chamber, so that the inflation pump box can work through the power supplied from the battery pack, thereby effectively improving the convenience of carrying and using the inflation pump box, and avoiding the use limit of the power wire being plugged into a household power supply in the conventional inflation pump box, and the user can use the inflation pump box to perform the inflation work when going out, effectively improving the use portability and convenience of the inflation pump box; the snap-in plate is detachably fitted and connected to the connection block, the battery pack is detachably fitted and connected to the battery chamber of the snap-in plate by means of the diameters of the latch and the groove, which is convenient for the user to install the battery pack into the battery chamber in the center of the snap-in plate, and to replace and adjust the snap-in plate according to the size of the battery pack; and the area of the cavity is larger than that of the connection block, and the area of the connection block is larger than that of the snap-in plate, which is convenient for the user to install and use the battery packs of various sizes and types, thereby effectively improving the user's convenience in using the inflation pump box.

BRIEF DESCRIPTION OF THE DRAWINGS

In order to illustrate the technical solutions in the embodiments of the present invention or in the prior art more clearly, a brief introduction to the figures to be used in the description of the embodiments or the prior art will be provided below. Obviously, the drawings in the following description show merely some embodiments of the present utility model, and those of ordinary skilled in the art would have derived other drawings from these drawings without involving any creative effort.

DETAILED DESCRIPTION OF EMBODIMENTS

The preferred embodiments of the present utility model will be described in detail below with reference to the accompanying drawings in order to make the advantages and features of the present utility model more readily understood by those skilled in the art, so that the scope of protection of the present utility model is more clearly and explicitly defined.

Figure 1:
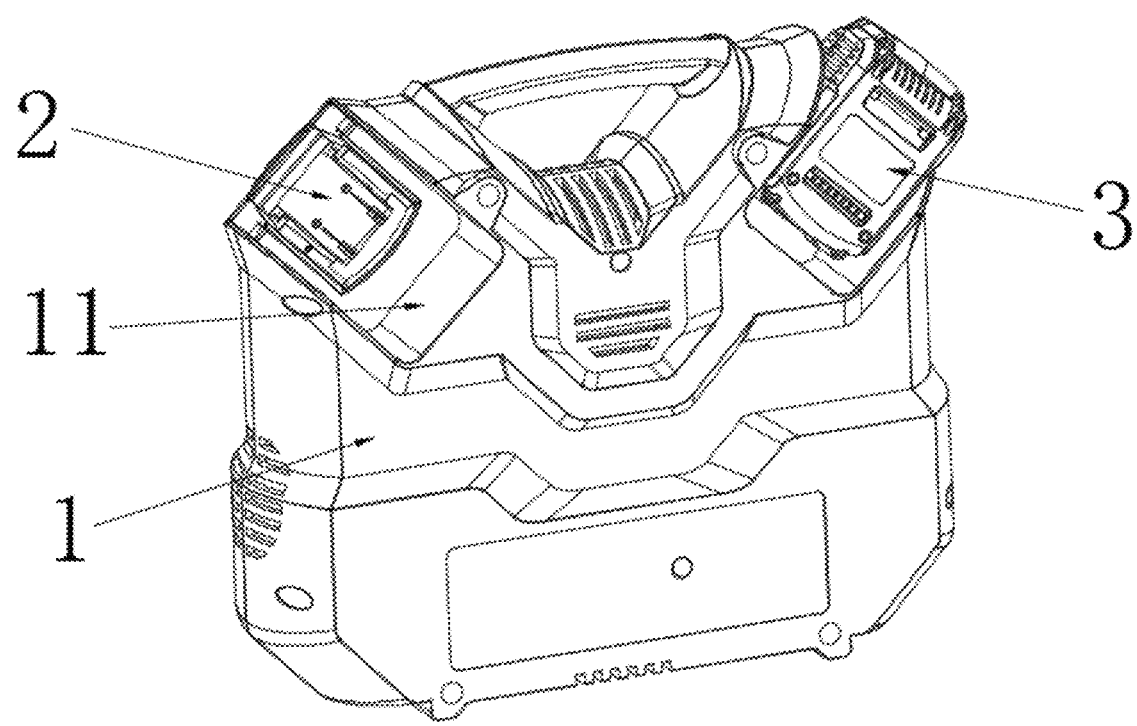
FIG. 1 is a schematic view showing the overall structure of an inflation pump box with a detachable power supply according to the present invention.
Figure 2:
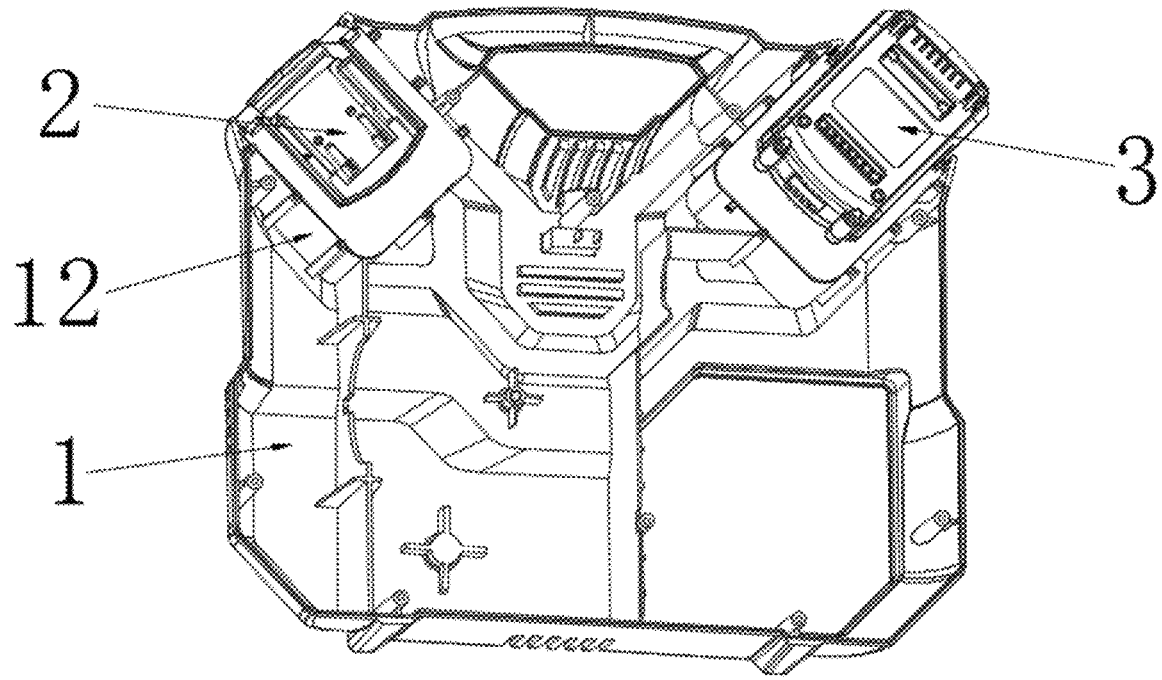
FIG. 2 is a view showing the internal structural of a box housing of an inflation pump box with a detachable power supply according to the present invention.
Figure 3:
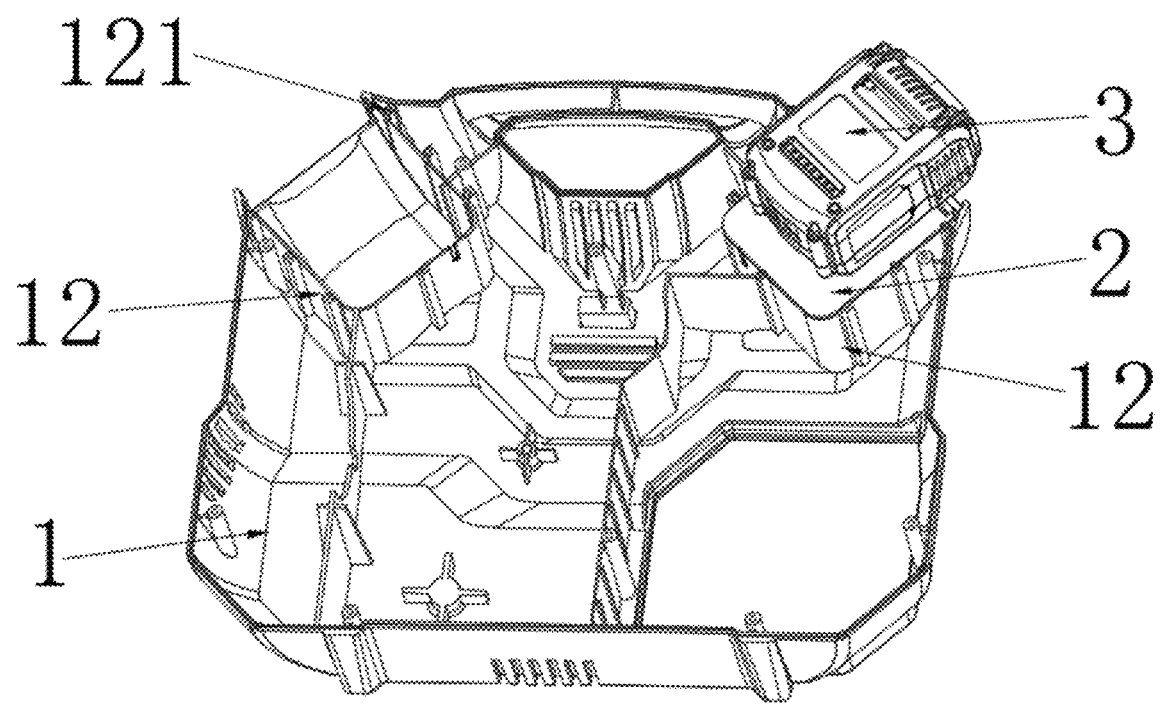
FIG. 3 is a structural effect view of the box housing of FIG. 2 after removing a snap-in plate.
Figure 4:
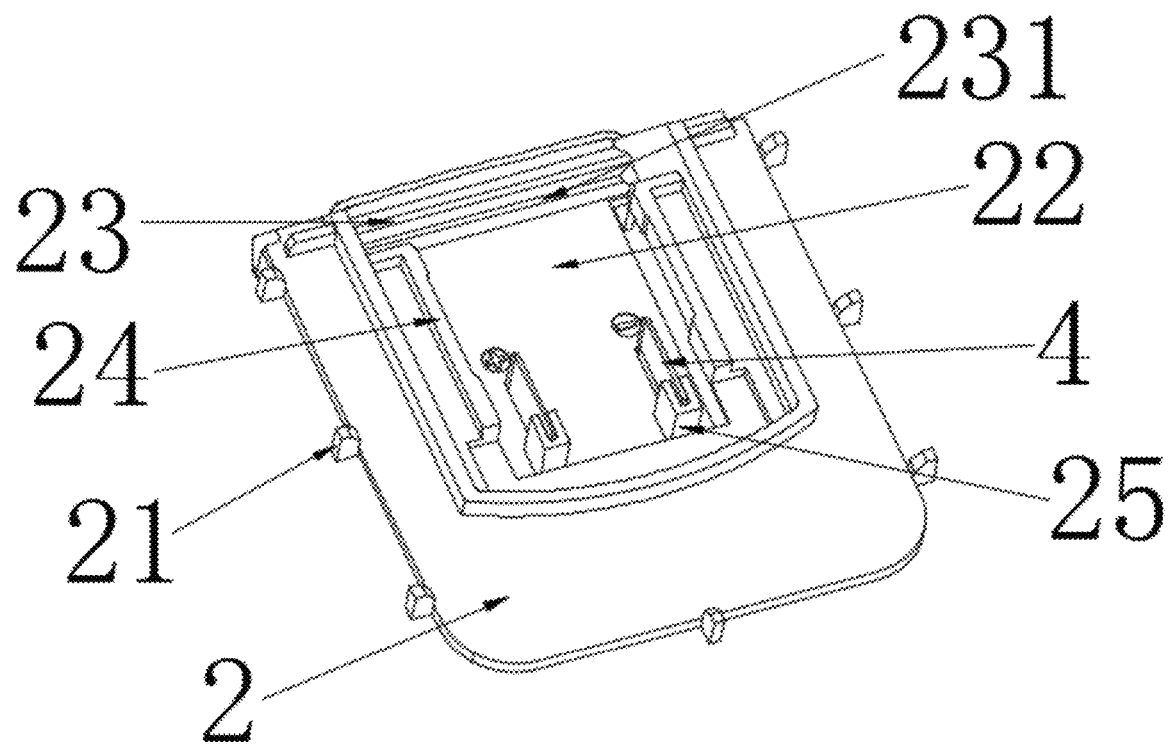
FIG. 4 is a structural view of a snap-in plate of an inflation pump box with a detachable power supply according to the present invention.
Figure 5:
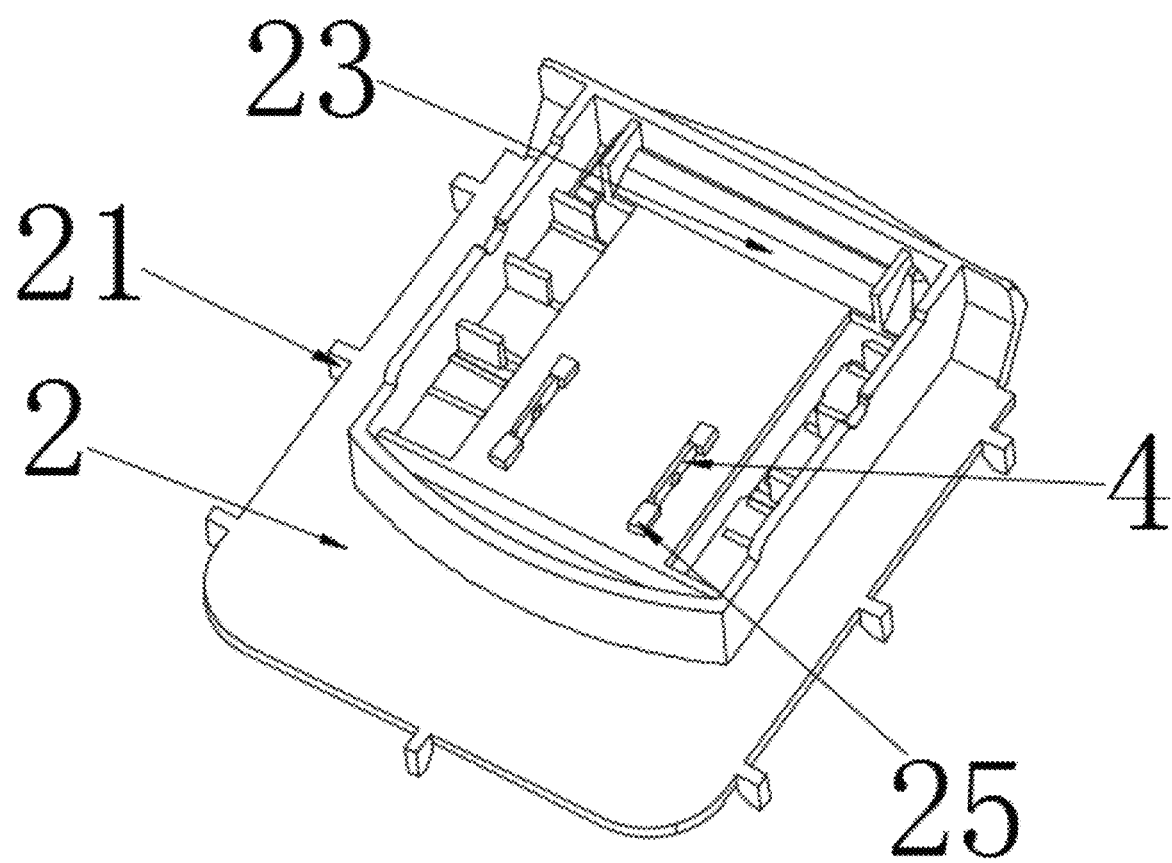
FIG. 5 is a structural view showing the back side of a snap-in plate of an inflation pump box with a detachable power supply according to the present invention.

As shown in FIGS. 1 to 5, an inflation pump box with a detachable power supply comprises a box housing 1 and a battery pack 3 fitted and connected to a surface of the box housing 1, wherein the surface of the box housing 1 is provided with a cavity 11, which cavity 11 is internally connected to a connection block 12, a snap-in plate 2 is detachably connected above the connection block 12, the center of the snap-in plate 2 is provided with a battery chamber 22 for installing the battery pack 3, a lock bar 23 for fixing the battery pack 3 is provided in front of the battery chamber 22, and a contact sheet 4 is provided at the center of the battery chamber 22.

The battery pack 3 is slidably provided at the center of the battery chamber 22, a side of the battery chamber 22 is provided with a slideway 24, and a side of the battery pack 3 is provided with a guide rail (not labeled), which is in a sliding fit with the slideway 24. The sliding fit between the guide rail and the slideway 24 enables the battery pack 3 to slide inside the battery chamber 22, so that the battery pack 3 can be installed into the battery chamber 22 or removed from the battery chamber 22.

A lock block 25 for fixing the contact sheet 4 is connected to the center of the battery chamber 22, and the contact sheet 4 is detachably fitted to the battery pack 3. When the battery pack 3 is installed inside the battery chamber 22, the contact sheet 4 inside the battery chamber 22 can make contact with the battery pack 3 and is then energized, and the contact sheet 4 penetrates the snap-in plate 2, such that the contact sheet 4 can be electrically connected to an electric motor (not labeled) inside the box housing 1, so that the battery pack 3 is electrically connected to the electric motor via the contact sheet 4 to supply power to the electric motor.

A groove 231 is provided in the center of the lock bar 23, a latch is provided in front of the battery pack 3, and the groove 231 is detachably fitted and connected to the latch. When the battery pack 3 is installed into the battery chamber 22, the battery pack 3 can be connected and fixed by fitting the latch to the groove 231, so as to prevent the battery pack 3 from falling off after the installation is completed. The latch of the battery pack 3 is a push button-type lock.

The connection block 12 is connected to an inner surface of the box housing 1, a snap groove (not labeled) is connected above the connection block 12, and a surface of the snap-in plate 2 is connected to a snap head 21, which snap head 21 is detachably fitted and connected to the snap groove, such that the connection block 12 is fixed to the inner surface of the box housing 1, and the snap-in plate 2 can be snap-fitted over the connection block 12 by fitting the snap head 21 to the snap groove, thereby facilitating the manufacturer to quickly assemble the snap-in plate 2.

One or more said cavities 11 are provided, each of the cavities 11 is respectively internally provided with a connection block 12, and the center of each connection block 12 is fitted and connected to a snap-in plate 2 for mounting the battery pack 3, such that the manufacturer can properly design the number of the cavities 11 according to the required installation condition of the battery pack 3, and the use of the inflation pump box with various voltage power supplies can be facilitated, thereby effectively improving the user's convenience of use.

The area of the cavity 11 is larger than that of the connection block 12, and the area of the connection block 12 is larger than that of the snap-in plate 2, so that battery packs 3 of various different types can be connected inside the cavity 11 through the snap-in plate 2, the size range of the battery packs 3 that can be installed is increased, and the assembly convenience of the manufacturer is effectively improved.

The inflation pump box with a detachable power supply connects the battery pack 3 inside the cavity 11 on the surface of the box housing 1 via the snap-in plate 2, and can replace and adjust the snap-in plate 2 according to the replacement of the types of the battery pack 3, so as to facilitate the installation and fixing of the battery pack 3. Moreover, the area of the cavity 11 is larger than that of the connection block 12, the area of the connection block 12 is larger than that of the snap-in plate 2, and the snap-in plate 2 is detachably fitted and connected to the connection block 12 via the snap head 21 and the snap groove, such that the user can replace and install the snap-in plate 2 according to the size of the battery pack 3, the large area of the cavity 11 is designed to facilitate the installation of the large-sized battery pack 3, thereby avoiding the problem that the battery pack 3 cannot be assembled into the cavity 11 on the surface of the box housing 1. Moreover, the contact sheet 4 is provided inside the battery chamber 22 of the snap-in plate 2, and the contact sheet 4 penetrates the snap-in plate 2 such that one side of the contact sheet 4 can make contact with and be connected to the battery pack 3 and the other side of the contact sheet 4 can be electrically connected to the electric motor inside the box housing 1, so that the battery pack 3 installed inside the snap-in plate 2 can supply power to the electric motor inside the box housing 1 for work. Moreover, the battery pack 3 and the snap-in plate 2 can be slidably installed by fitting the guide rail to the slideway 24, and the battery pack 3 and the snap-in plate 2 can also be installed and fixed via the latch and the groove 231, that is, the latch at an end portion of the battery pack 3 is snapped into the groove 231 in the lock bar 23 at the front end of the snap-in plate 2, so as to avoid the problem that the battery pack 3 may slip after being installed.

The present invention has the following beneficial effects: the inflation pump box with a detachable power supply has the characteristics of disassembling, replacing and adjusting the battery pack, and is convenient for the user to operate and use, thereby effectively improving the use portability and convenience of the user; since the surface of the box housing is provided with a cavity which is internally connected to a connection block for installing the snap-in plate, a battery chamber for installing the battery pack is provided in the center of the snap-in plate, and a lock bar for fixing the battery pack is provided in front of the battery chamber, such that the battery pack can be fixed inside the battery chamber of the center of the snap-in plate via the lock bar, the battery pack is installed inside the cavity through the connection between the snap-in plate and the connection block, and the battery pack is detachably assembled to the surface of the box housing, and is electrically connected to the battery pack via the contact sheet in the center of battery chamber, so that the inflation pump box can work through the power supplied from the battery pack, thereby effectively improving the convenience of carrying and using the inflation pump box, and avoiding the use limit of the power wire being plugged into a household power supply in the conventional inflation pump box, and the user can use the inflation pump box to perform the inflation work when going out, effectively improving the use portability and convenience of the inflation pump box; the snap-in plate is detachably fitted and connected to the connection block, the battery pack is detachably fitted and connected to the battery chamber of the snap-in plate by means of the diameters of the latch and the groove, which is convenient for the user to install the battery pack into the battery chamber in the center of the snap-in plate, and to replace and adjust the snap-in plate according to the size of the battery pack; and the area of the cavity is larger than that of the connection block, and the area of the connection block is larger than that of the snap-in plate, which is convenient for the user to install and use the battery packs of various sizes and types, thereby effectively improving the user's convenience in using the inflation pump box.

The above description is merely directed to specific embodiments of the present invention, but the scope of protection of the present invention is not limited thereto, and any changes or substitutions that would be conceivable without involving any inventive efforts shall fall within the scope of protection of the present utility model. Therefore, the scope of protection of the present invention should be determined by the scope of protection defined by the claims.

What is claimed is:

1. An inflation pump box with a detachable power supply, comprising a box housing and a battery pack fitted and connected to a surface of the box housing, wherein the surface of the box housing is provided with at least one cavity each of which is internally connected to a connection block, a snap-in plate is detachably connected above the connection block, a center of the snap-in plate is provided with a battery chamber for installing the battery pack, a lock bar for fixing the battery pack is provided in front of the battery chamber, and a contact sheet is provided at the center of the battery chamber.

2. The inflation pump box with a detachable power supply according to claim 1, wherein the battery pack is slidably provided at a center of the battery chamber, a side of the battery chamber is provided with a slideway, and a side of the battery pack is provided with a guide rail which is in a sliding fit with the slideway.

3. The inflation pump box with a detachable power supply according to claim 1, wherein a lock block for fixing the contact sheet is connected to a center of the battery chamber, and the contact sheet is detachably fitted to the battery pack and penetrates the snap-in plate.

4. The inflation pump box with a detachable power supply according to claim 1, wherein a groove is provided in a center of the lock bar, a latch is provided in front of the battery pack, and the groove is detachably fitted and connected to the latch.

5. The inflation pump box with a detachable power supply according to claim 1, wherein the connection block is connected to an inner surface of the box housing, a snap groove is connected above the connection block, and a surface of the snap-in plate is connected to a snap head which is detachably fitted and connected to the snap groove.

6. The inflation pump box with a detachable power supply according to claim 1, wherein the area of the cavity is larger than that of the connection block, and the area of the connection block is larger than that of the snap-in plate.

* * * * *